United States Patent
Hsu et al.

(10) Patent No.: US 7,751,002 B2
(45) Date of Patent: Jul. 6, 2010

(54) TRANSFLECTIVE LCD PANEL AND PIXEL STRUCTURE WITH FIRST AND SECOND OVERLAPPING COMMON ELECTRODES DISPOSED IN ONE DIRECTION BOTH OVERLAPPING DATA LINE DISPOSED IN A SECOND DIRECTION

(75) Inventors: Shih-Chia Hsu, Hsin-Chu (TW);
Ying-Ru Chen, Hsin-Chu (TW);
Hsiang-Lin Lin, Hsin-Chu (TW);
Ching-Huan Lin, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 172 days.

(21) Appl. No.: 12/190,601

(22) Filed: Aug. 13, 2008

(65) Prior Publication Data

US 2009/0141222 A1    Jun. 4, 2009

(30) Foreign Application Priority Data

Nov. 30, 2007   (TW) ............................ 96145744 A (51) Int. Cl.
G02F 1/1335   (2006.01)
(52) U.S. Cl. ..................... 349/114; 349/39; 349/147
(58) Field of Classification Search ............ 349/38, 349/39, 114, 147
See application file for complete search history.

(56) References Cited

U.S. PATENT DOCUMENTS

| 7,133,087 | B2 | 11/2006 | Kim | |
|---|---|---|---|---|
| 7,180,564 | B2 * | 2/2007 | Shimizu et al. | 349/141 |
| 7,545,463 | B2 * | 6/2009 | Park | 349/113 |
| 2006/0023138 | A1 | 2/2006 | Choi | |
| 2007/0013625 | A1 | 1/2007 | Hong | |
| 2009/0002611 | A1 * | 1/2009 | Jiang et al. | 349/114 |

FOREIGN PATENT DOCUMENTS

| TW | 200510853 | 3/2005 |
|---|---|---|
| TW | I258862 | 7/2006 |

* cited by examiner

*Primary Examiner*—John Heyman
(74) *Attorney, Agent, or Firm*—Winston Hsu (57) ABSTRACT

A pixel structure of a transflective LCD panel includes a substrate, a data line and a scan, a thin film transistor containing an extending electrode, a first common electrode and a second common electrode, a transmissive pixel electrode, and a reflective pixel electrode forming a first coupling capacitor with the extending electrode and a second coupling capacitor with the second common electrode. The first and second common electrodes and the data line overlap with each other in an overlapping area, wherein the first common electrode is disposed between the second common electrode and the data line.

20 Claims, 12 Drawing Sheets

TRANSFLECTIVE LCD PANEL AND PIXEL STRUCTURE WITH FIRST AND SECOND OVERLAPPING COMMON ELECTRODES DISPOSED IN ONE DIRECTION BOTH OVERLAPPING DATA LINE DISPOSED IN A SECOND DIRECTION

BACKGROUND OF THE INVENTION

1. Field of the Invention

The present invention relates to a transflective liquid crystal display (LCD) panel and a pixel structure thereof, and more particularly, to a transflective LCD panel with a single gap and a pixel structure thereof.

2. Description of the Prior Art

Most LCDs can be categorized into three kinds: the transmissive type, the reflective type, and the transflective type according to their light source. The transmissive LCD uses backlight as a source for emitting light. The light emitted by the backlight will pass through the LCD panel to let an user see the image displayed on the LCD panel. The reflective LCD has a reflective pixel electrode. When displaying the image, the ambient light will enter the LCD from the user side and then be reflected by the reflective pixel electrode. The reflected light will pass through the reflective LCD panel again, and finally the user can see the image displayed on the LCD. The transflective LCD panel has the LCD both of transmissive type and reflective type. In other words, each pixel area of the transflective LCD panel comprises a transmission region and a reflection region.

Generally, a traditionally transflective LCD panel has an array substrate, a color filter substrate, and a liquid crystal layer disposed between the two substrates. The transflective LCD panel further includes pluralities of pixel areas, and each of the pixel areas comprises a reflection region and a transmission region, while each reflection region and each transmission region has a reflective pixel electrode and a transmission pixel electrode respectively. Because the transmission region of the transflective LCD panel uses a backlight as its light source, the light will pass through the liquid crystal layer only once. However, the reflection region uses the ambient light as a light source, so that the light will pass through the liquid crystal layer twice. In such a case, the optical path-length difference in the reflection region is twice as much as that in the transmission region, such that the relation of reflectance versus voltage mismatches the relation of transmittance versus voltage (i.e. gamma curve) while driving the liquid crystal (LC) molecules.

For this reason, manufacturers have designed a transflective LCD panel having a dual cell gap to solve the problem of mismatching driving voltage. More specifically, in this kind of transflective LCD panel, a dielectric layer is disposed under the reflective pixel electrode so as to adjust a cell gap of the reflection region. By disposing the dielectric layer, the cell gap of the liquid crystal layer in the reflection region is smaller than the cell gap in the transmission region, so that the optical path-length difference of light passing through the reflection region is the same as that of light passing through the transmission region. However, although the problem of mismatching driving voltage may be solved through the above-mentioned design of dual gap by adjusting the optical path-length difference in the transflective LCD panel, an obvious height difference of the border between the reflection region and the transmission region will make the LC molecules difficult to align, thereby resulting in light leakage and lowering the quality of displayed images. Furthermore, the step of fabricating the dielectric layer in the reflection region increases the fabrication cost and decreases yield.

On the other hand, in order to solve the mismatching problem of gamma curves of the transmission mode and the reflection mode of the transflective LCD panel, manufacturers have also develop an adjusted capacitance coupling (ACC) technique, by the way of disposing a first common electrode, a second common electrode, a first coupling capacitor ($C_C$), and a second coupling capacitor ($C_2$) in the transflective LCD panel to change the voltage difference of the reflection region through the coupling of the first coupling capacitor and the second coupling capacitor, so as to adjust the gamma curve of the reflection type to match the gamma curve of the transmission type. However, in the device arrangement of the current ACC technique design, the additional second common electrode crosses the data line on the array substrate such that the voltage of the second common electrode will be affected when a signal is transferred through the data line to the pixels of the display panel, resulting in serious cross-talk problem, which cannot meet the requirement of product standard that the cross-talk has to be less than 2%. As a result, the current ACC transflective LCD panel with a single gap still has an apparent disadvantage of serious cross-talk and cannot display high-quality images for meeting the product standards.

SUMMARY OF THE INVENTION

It is one of the objectives of the present invention to provide a single-gap transflective LCD panel that has a special arrangement of the first common electrode and the second common electrode to solve the above-mentioned problem of serious cross-talk resulted from the effect between the overlapping second common electrode and data line of the prior-art transflective LCD panel.

The present invention provides a pixel structure for applying to a transflective LCD panel. The pixel structure is adapted to a substrate having a pixel area comprising a reflection region and a transmission region. The pixel structure comprises a data line disposed on the substrate along a first direction; a scan line disposed on the substrate along a second direction, wherein the second direction intersects the first direction; a TFT electrically connected to the scan line and the data line, comprising an extending electrode; and a first common electrode and a second common electrode disposed on the substrate substantially along the second direction, the first common electrode and the second common electrode intersecting the data line in an overlapping area where the first common electrode, the second common electrode, and the data line overlap with each other, the first common electrode in the overlapping area being disposed between the second common electrode and the data line; a transmission pixel electrode electrically connected to the TFT; and a reflective pixel electrode forming a first coupling capacitor by coupling with the extending electrode and a second coupling capacitor by coupling with the second common electrode.

The present invention further provides a transflective LCD panel comprising: a first substrate having a pixel area comprising a reflection region and a transmission region; a data line disposed on the first substrate along a first direction; a scan line disposed on the first substrate along a second direction, the second direction and the first direction intersecting with each other; a first common electrode and a second common electrode disposed on the first substrate, wherein the first common electrode and the second common electrode are arranged substantially along the second direction and intersect the data line in an overlapping area, and the first common electrode, the second common electrode, and the data line overlap with each other in the overlapping are while the first common electrode in the overlapping area is disposed between the second common electrode and the data line; a transmission pixel electrode electrically connected to the TFT; a reflective pixel electrode, forming a first coupling capacitor by coupling with the extending electrode and a second coupling capacitor by coupling with the second common electrode; a second substrate disposed oppositely to the first substrate; and a liquid crystal layer disposed between the first substrate and the second substrate.

It is an advantage of the pixel structure of the present invention that the first common electrode, the second common electrode, and the data line overlap with each other in the overlapping area while the first common electrode is disposed between the data line and the second common electrode within their overlapping part. Therefore, the first common electrode substantially shields the affection to the second common electrode from the data line. Accordingly, the voltage of the second common electrode will not be affect when a signal is inputted in the data line, and the cross-talk effect is reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
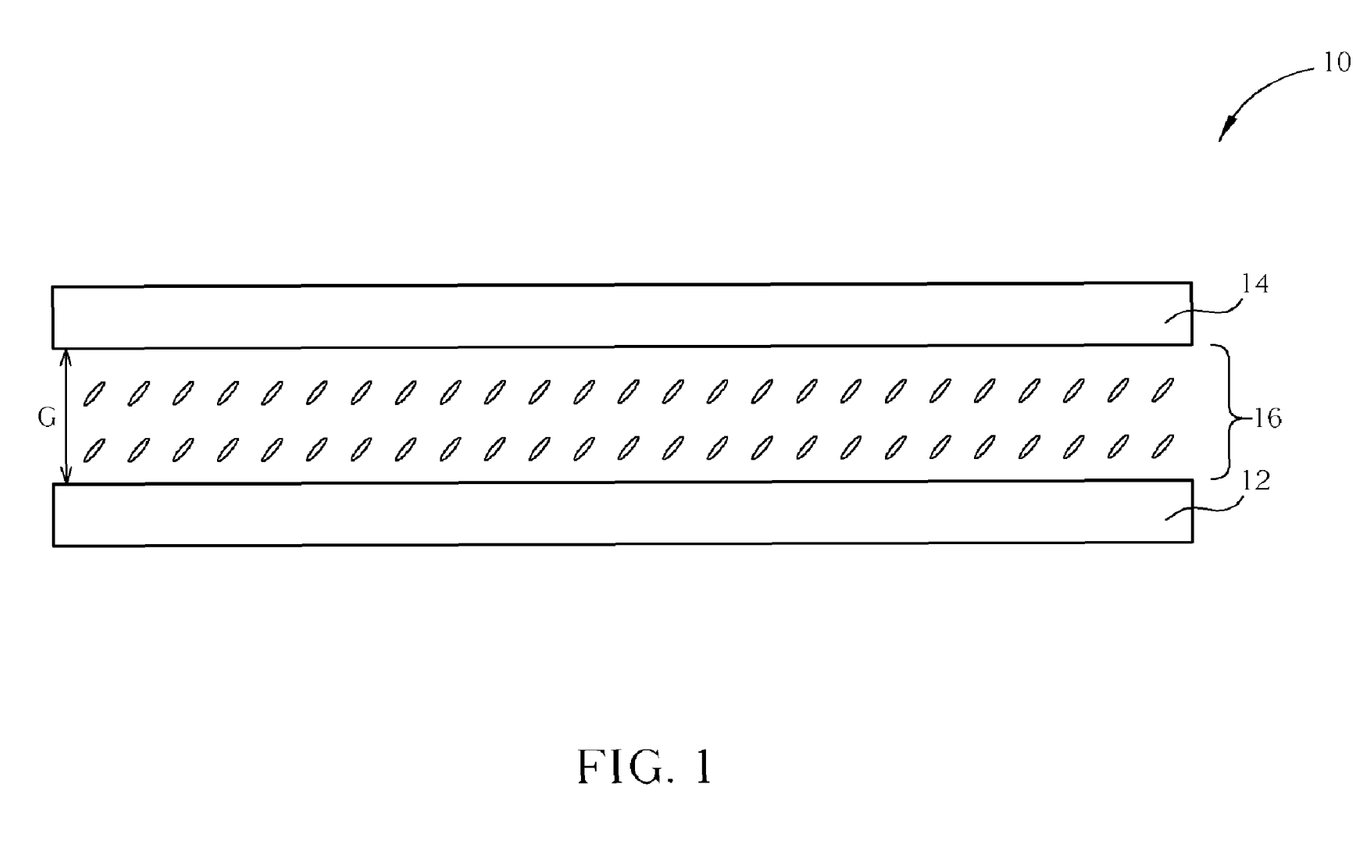
FIG. 1 is a schematic diagram of a transflective LCD panel according to the present invention.

FIG. 1 is a schematic diagram of a transflective LCD panel 10 according to the present invention. The transflective LCD panel 10 comprises a first substrate 12, a second substrate 14 disposed parallel with and oppositely to the first substrate 12, and a liquid crystal layer 16 disposed between the first substrate 12 and second substrate 14. Generally, the first substrate 12 may be called as an array substrate or a pixel substrate, having a plurality of pixel areas 18 (shown in FIG. 2) defined thereon and arranged as an array in the display area of the transflective LCD panel 10. The second substrate 14 may be called as a color filter (CF) substrate because CFs and black matrix layers are disposed on the surface of the second substrate 14 and each pixel area 18 may produce corresponding colorful lights. In addition, the present invention transflective LCD panel 10 uses an adjusted capacitance coupling (ACC) technique for adjusting the gamma curve of the reflection mode, and therefore preferably has only a single gap G.

Figure 2:
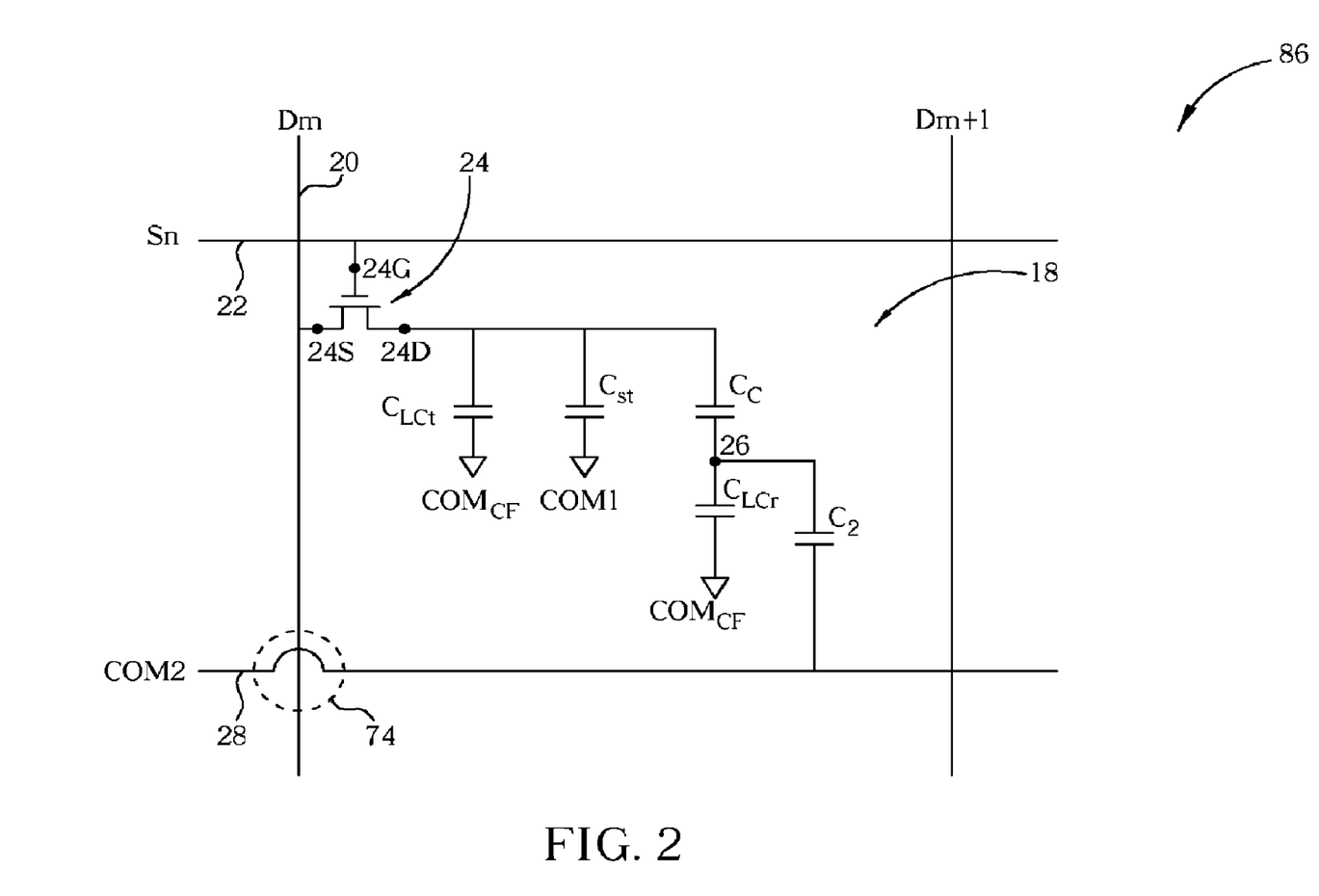
FIG. 2 is an equivalent circuit model of a pixel structure of the transflective LCD panel shown in FIG. 1.

FIG. 2 is an equivalent circuit model of a pixel structure 86 of the transflective LCD panel 10, wherein the pixel structure 86 corresponds to one pixel area 18 of the first substrate 12. The pixel area 18 comprises at least a data line 20 and a scan line 22. The pixel area 18 further comprises a TFT 24, whose gate 24G and source 24S are electrically connected to the scan line 22 and the data line 20 respectively, while the drain 24D of the TFT 24 is electrically connected to the top electrode plates of the transmission LC capacitor $C_{LCt}$, the storage capacitor $C_{st}$, and the first coupling capacitor $C_C$. The bottom electrode plate 26 of the first coupling capacitor $C_C$ is electrically connected to the reflection LC capacitor $C_{LCr}$ and the second coupling capacitor $C_2$, wherein both the transmission LC capacitor $C_{LCt}$ and the reflection LC capacitor $C_{LCr}$ take the transparent electrode disposed on the surface of the second substrate 14 as their bottom electrode plate, and the storage capacitor $C_{st}$ takes the first common electrode COM1 on the surface of the first substrate 12 as its bottom electrode plate. In addition, the pixel area 18 further comprises a second common electrode (COM2) 28 coupling to a periphery circuit on the first substrate 12, which serves as the bottom electrode plate of the second coupling capacitor $C_2$.

Figure 3:
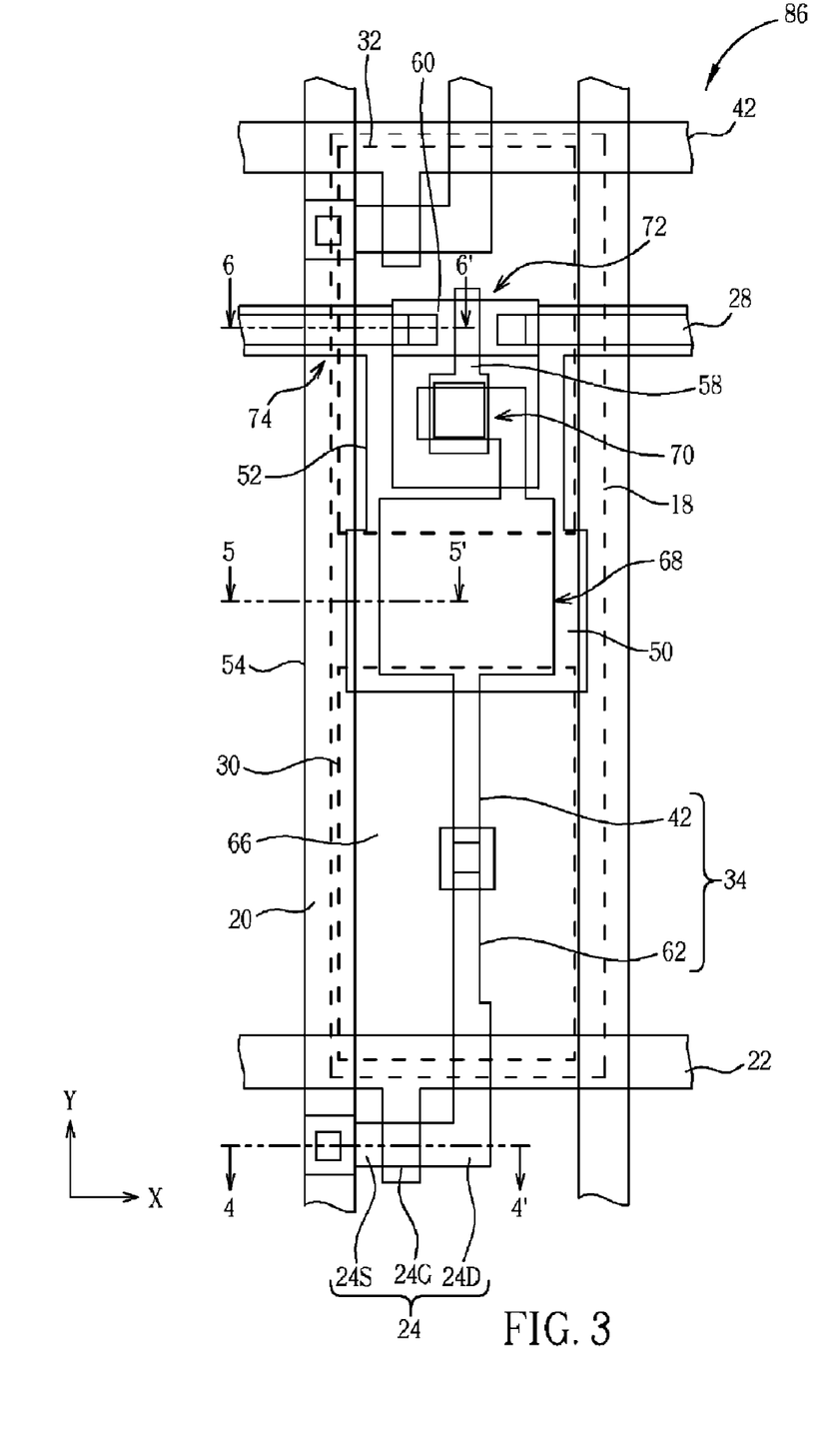
FIG. 3 is a schematic diagram of top view of the device arrangement of the pixel structure according to a first embodiment of the present invention.
Figure 4:
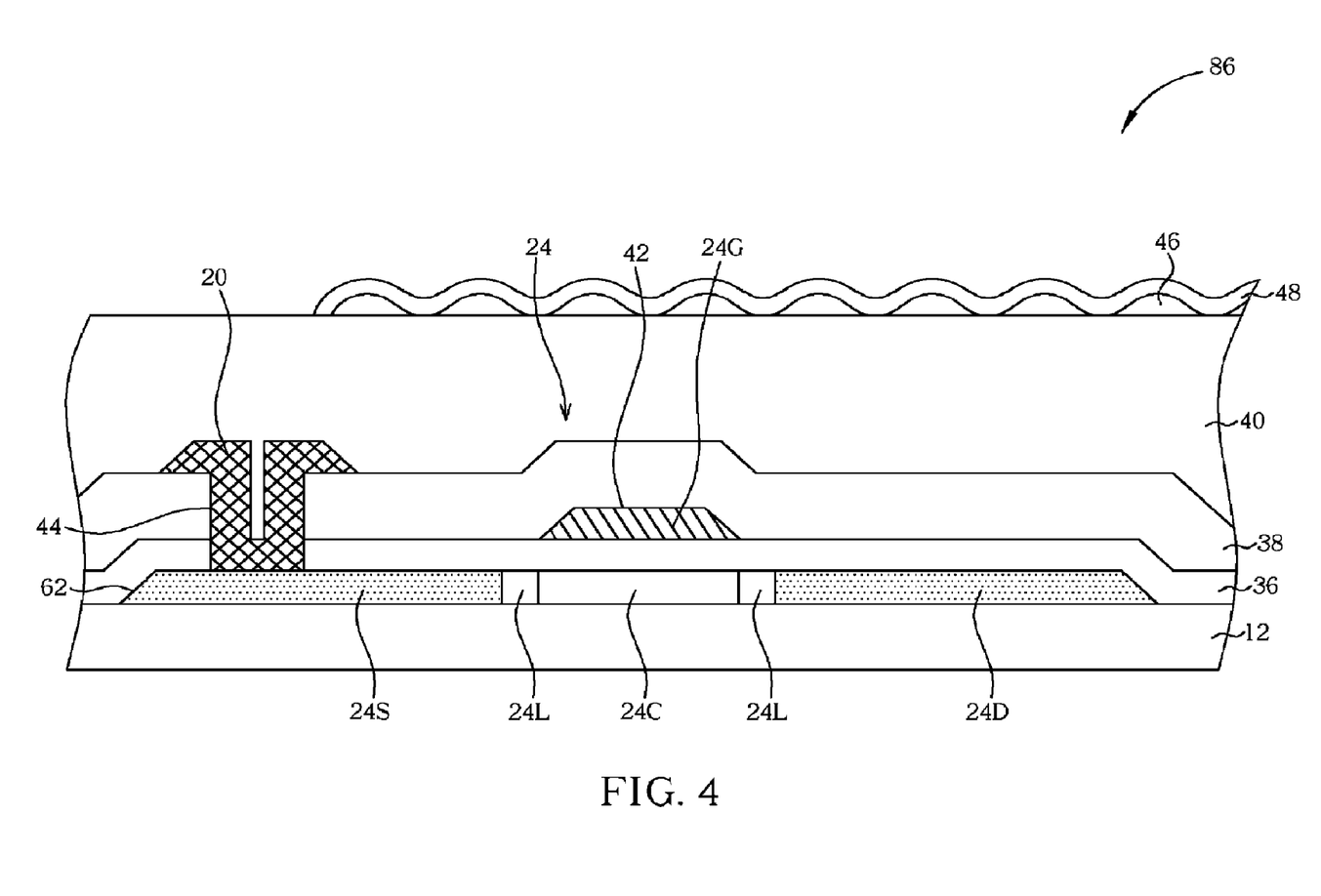
FIGS. 4-6 are sectional views along line 4-4', 5-5', and 6-6' of the pixel structure 86 in FIG. 3 respectively.
Figure 5:
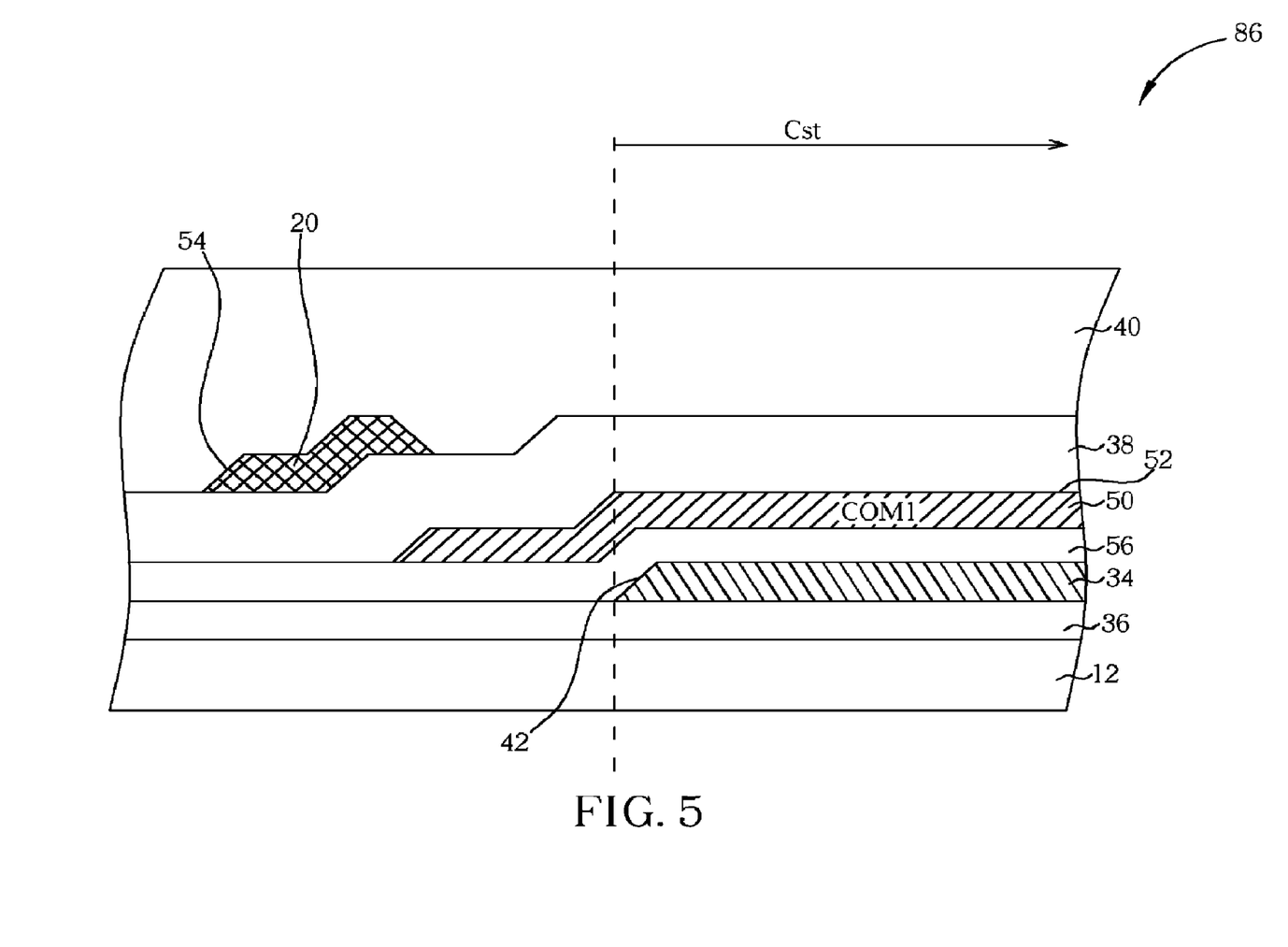
Figure 6:
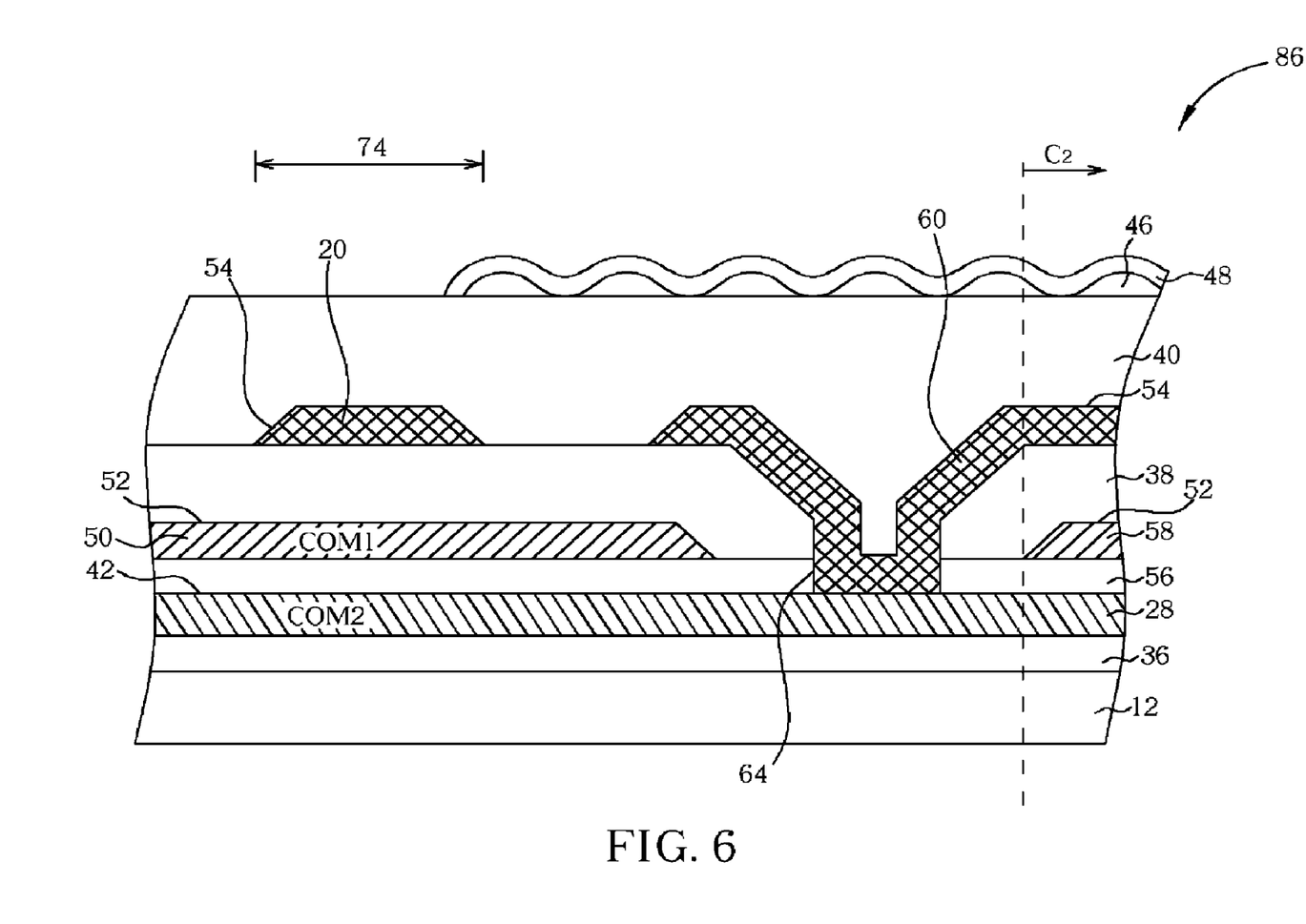

With reference to FIGS. 3-6, FIG. 3 is a schematic diagram of top view of the device arrangement of the pixel structure 86 according to a first embodiment of the present invention, and FIGS. 4-6 are sectional views along line 4-4', 5-5', 6-6' of the pixel structure 86 in FIG. 3. In order to simplify the figure, only the devices on the first substrate 12 are illustrated in FIGS. 3-6. As shown in FIG. 3, the pixel area 18 are broadly defined by two data lines 20 and two scan lines 22, wherein the data lines 20 and scan lines 22 are disposed on the first substrate 12 along a first direction (such as direction Y) and a second direction (such as direction X) respectively. The first direction intersects and is perpendicular to the second direction. Further, the pixel area 18 further comprises a transmission region 30 and a reflection region 32. The TFT 24 is positioned in the reflection region 32 of another adjacent pixel area 18, and near the intersection part of the data line 20 and scan line 22. The TFT 24 has an extending electrode 34 electrically connected to the drain 24D. However, the extending electrode 34 may be considered as a portion of the drain 24D. Referring to FIG. 4, the TFT 24 is a top-gate type TFT, having a source 24S, a drain 24D, and a channel region 24C formed in the first patterned conductive layer 62. In this embodiment, the first patterned conductive layer 62 comprises polysilicon materials. The source 24S and drain 24D are formed at two side parts of the first patterned conductive layer 62 through an ion implantation process of these parts of the first patterned conductive layer 62, while the middle part without doping of ions serves as the channel region 24C of the TFT 24. Above the first patterned conductive layer 62, a gate insulating layer 36, a gate 24G, an inter-layer dielectric (ILD) layer 38, and a planarization layer 40 are disposed on the first substrate 12 in order. The gate 24G is composed of a second patterned conductive layer 42. In addition, the data line 20 is electrically connected to the source 24S through the via hole 44 disposed in the gate insulating layer 36 and the ILD layer 38.

Referring to FIG. 3, the material composing the extending electrode 34 may comprise the first patterned conductive layer 62 and the second patterned conductive layer 42, extending form the drain 24D up through the transmission region 30 and the storage capacitor region 68 into the reflection region 32 of the pixel area 18. In the transmission region 30, the extending electrode 34 is electrically connected to the transmission pixel electrode 66, so that the transmission pixel electrode 66 and the transparent electrode $COM_{CF}$ (not shown, disposed on the lower surface of the second substrate 14) on another side of the liquid crystal layer 16 forms an transmission LC capacitor $C_{LCt}$, wherein the liquid crystal layer 16 serves as the dielectric layer of the transmission LC capacitor $C_{LCt}$.

Referring to FIG. 5, FIG. 5 is a schematic diagram of the sectional view along line 5-5' of the storage capacitor region 68 of FIG. 3. With comparison of FIG. 5 and FIG. 3, the storage capacitor region 68 comprises the first common electrode 50, which is composed of the third patterned conductive layer 52. The extending electrode 34 positioned in the storage capacitor region 68 is considered as the top electrode plate of the storage capacitor $C_{st}$, the first common electrode 50 is considered as the bottom electrode plate of the storage capacitor $C_{st}$, and the dielectric layer 56 positioned between the second patterned conductive layer 42 and the third patterned conductive layer 52 serves as the dielectric layer between the top and bottom electrode plates of the storage capacitor $C_{st}$. In addition, the material of the data line 20 comprises the fourth patterned conductive layer 54, which is disposed above the second patterned conductive layer 42 and the third patterned conductive layer 52.

With reference to FIG. 6 and FIG. 3 at the same time, after the extending electrode 34 lines through the storage capacitor region 68, it continuously extends up to the reflection region 32. The reflection region 32 comprises a reflective pixel electrode 58 composed of the third patterned conductive layer 52. In the reflection region 32, the extending electrode 34 and reflective pixel electrode 58 are coupled to form a first coupling capacitor 70, wherein the dielectric layer 56 disposed vertically between the third patterned conductive layer 52 and second patterned conductive layer 42 serves as the dielectric layer of the first coupling capacitor 70. In addition, on the surface of the planarization layer 40 an adjusting layer 46 with a rough surface is disposed in the reflection region 32, which forms pluralities of bumps. A reflection layer 48 is disposed on the adjusting layer 46 and has a rough and uneven surface for reflection light out of the transflective LCD panel 10. The reflection layer 48 is preferably formed with conductive metal materials, such as aluminum. The reflection layer 48 is electrically connected to the reflective pixel electrode 58 through a contact plug (not shown), and may be considered as a portion of the reflective pixel electrode 58. As a result, in the reflection region 62, the reflection layer 48 (or the reflective pixel electrode 58) and the transparent electrode positioned on the other side of the liquid crystal layer 16 forms the reflection LC capacitor $C_{LCr}$. Furthermore, the second common electrode 28 in the reflection region 32 is substantially arranged along the second direction and formed with the second patterned conductive layer 42, wherein the second common electrode 28 and the first common electrode 50 are electrically insulated by the dielectric layer 56. In addition, the fourth patterned conductive layer 54 further forms a second common electrode branch 60, serving as a portion of the second common electrode 28 because the second common electrode branch 60 is electrically connected to the second common electrode 28 comprising the second patterned conductive layer 42 through the via hole 64. As shown in FIG. 6, the second common electrode 28 and the reflective pixel electrode 58 are coupled to form the second coupling capacitor 72.

With comparison to FIG. 3 and FIG. 6, the first common electrode 50 is arranged on the first substrate 12 substantially along the second direction, similar to the second common electrode 28, and parallel to the scan line 22. However, in order to avoid the problem of cross-talk caused by the intersection of the second common electrode 28 and the data line 20 in the prior-art structure, a portion of the first common electrode 50 of the present invention pixel structure 86 is specially designed to shift upwardly from the storage capacitor region 68 and to pass through the intersection portion of the second common electrode 28 and the data line 20. Furthermore, the first common electrode 50 is disposed between the second common electrode 28 and the data line 20 vertically so as to shield the affect to the second common electrode 28 from the data line 20. In other words, the first and second common electrodes 50, 28 arranged along the second direction intersect the data line 20 arranged along the first direction in an overlapping area 74. Besides, the first and second common electrodes 50, 28 and the data line 20 overlap with each other in the overlapping area 74, while the first common electrode 50 in the overlapping area 74 is disposed between the second common electrode 28 and data line 20 vertically. As shown in FIG. 6, in the overlapping area 74, the data line 20 is disposed above both of the first and second common electrodes 50, 28, and the first common electrode 50 in the overlapping area 74 is disposed above the second common electrode 28, such that the first common electrode 50 can effectively shield the influence of the data line 20 to the second common electrode 28 and reduce cross-talk effect.

In this embodiment, the second patterned conductive layer 42 forms the second common electrode 28, the scan line 22 and a portion of the extending electrode 34, the third patterned conductive layer 52 forms the first common electrode 50 and the reflective pixel electrode 58, and the fourth patterned conductive layer 54 forms the data line 20 and the second common electrode branch 54. As a result, the materials of the second, the third, and the fourth patterned conductive layers 42, 52, 54 preferably comprise metal materials with good conductivity, such as copper (Cu), chromium (Cr), and molybdenum (Mo). In addition, the second, the third, and the fourth patterned conductive layers 42, 52, 54 may be considered as a first metal layer, a second metal layer, and a third metal layer. In this situation, in order to reduce the total amounts of photomask and photolithography process applied in the whole fabrication process, two ion implantation processes and the photolithography process for defining the pattern of the second patterned conductive layer 42 may be integrated into one process when fabrication the TFT 24 according to the present invention.

Figure 7:
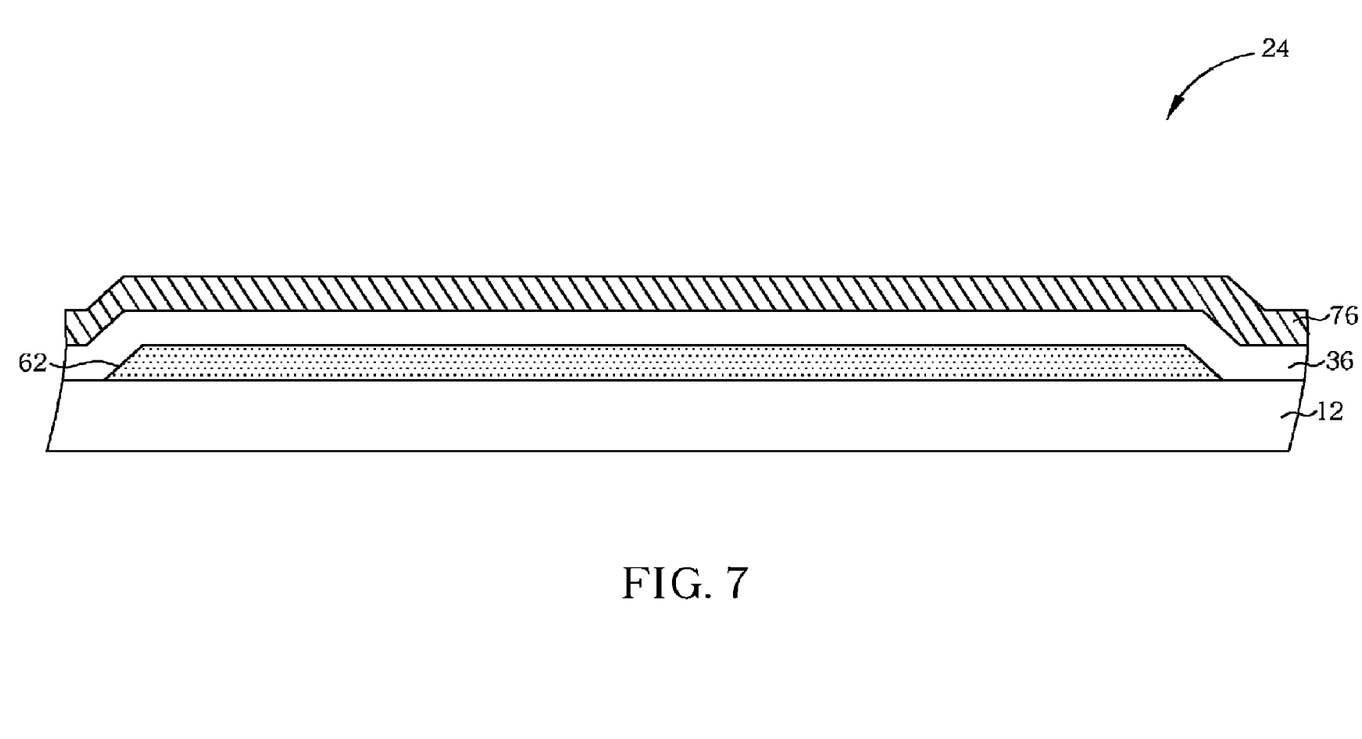
FIGS. 7-9 are schematic diagrams of the fabrication process of the TFT shown in FIG. 3 according to a first embodiment of the present invention.

FIG. 7 to FIG. 9 are schematic diagrams of the fabrication process of the TFT 24 according to the first embodiment of the present invention. First, as shown in FIG. 7, the first substrate 12 is provided, and then a first patterned conductive layer 62 is formed on the first substrate 12, comprising the predetermined areas for forming source, drain, and channel region. The formation method of the first patterned conductive layer 62 includes sequentially forming a low-temperature polysilicon material and a photoresist layer on the first substrate 12, performing a photolithography process to use a photomask with patterns of the source, drain, channel region, and a portion of the extending electrode 34 to pattern the photoresist layer, and taking the patterned photoresist layer as a mask to etch the low-temperature polysilicon material to form the first patterned conductive layer 62. Thereafter, a gate insulating layer 36 and a first metal layer 76 are sequentially formed on the first substrate 12, covering the first patterned conductive layer 62.

Figure 8:
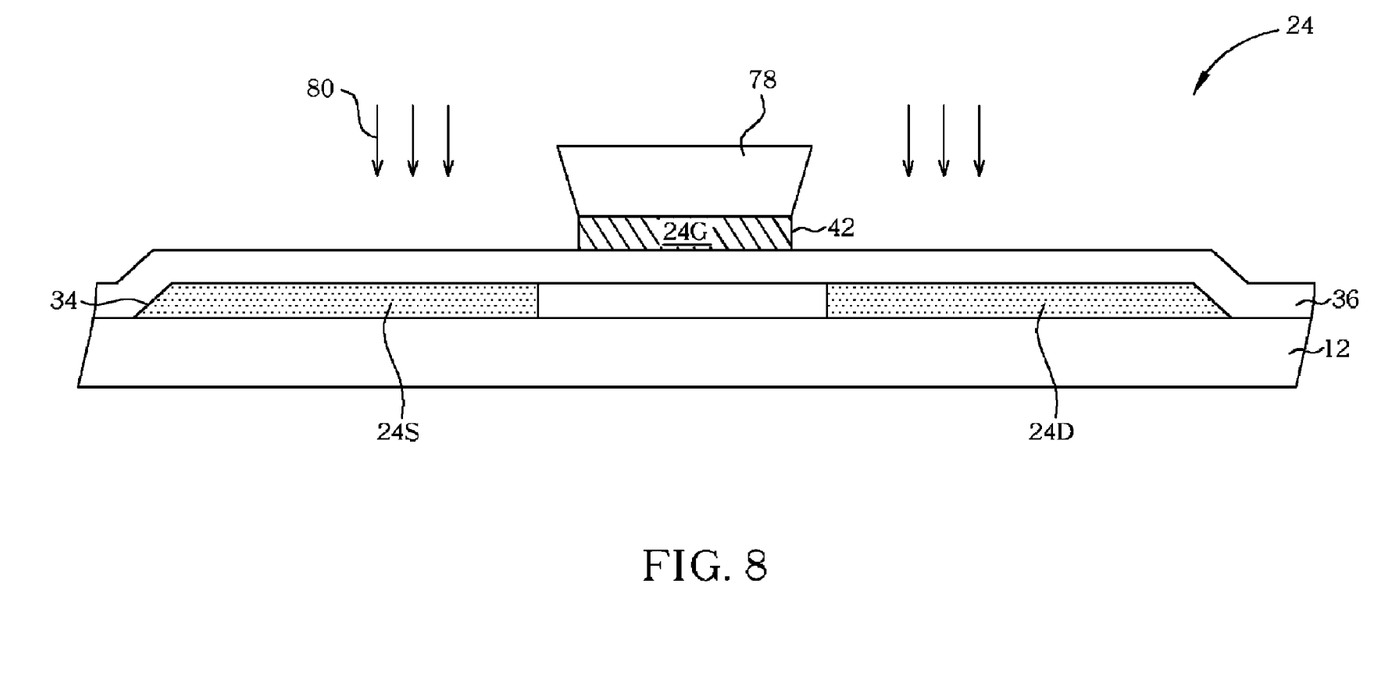

Then, referring to FIG. 8, a photoresist layer is formed on the first substrate 12, preferably comprising negative-type photoresist materials, and a photolithography process is performed to the photoresist layer so as to form a patterned photoresist layer 78 with a pattern a little larger than a predetermined pattern of the gate. Thereafter, the patterned photoresist layer 78 is taken as an etching mask to perform a dry-etching process and a wet-etching process to the first metal layer 76 in order. After these etching processes, the bottom of the patterned photoresist layer 78 and the first metal layer 76 are under-cut, such that the bottom surface of the patterned photoresist layer 78 is smaller than the top surface of the patterned photoresist layer 78. Accordingly, the patterned first metal layer 76 forms the second patterned conductive layer 42 containing the gate 24G. Wherein, the pattern of the gate 24G is approximately smaller than the patterned photoresist layer 78. Sequentially, an upright ion implantation process 80 with high concentration ions, such as a P+ type ion implantation process, is performed to form the source 24S and drain 24D near two sides of the gate 24G on the first patterned conductive layer 62. As shown in FIG. 8, the top surface of the patterned photoresist layer 78 is larger than the gate 24G, and therefore the spacing of the source 24S and the drain 24D is larger than the width of the gate 24G.

Figure 9:
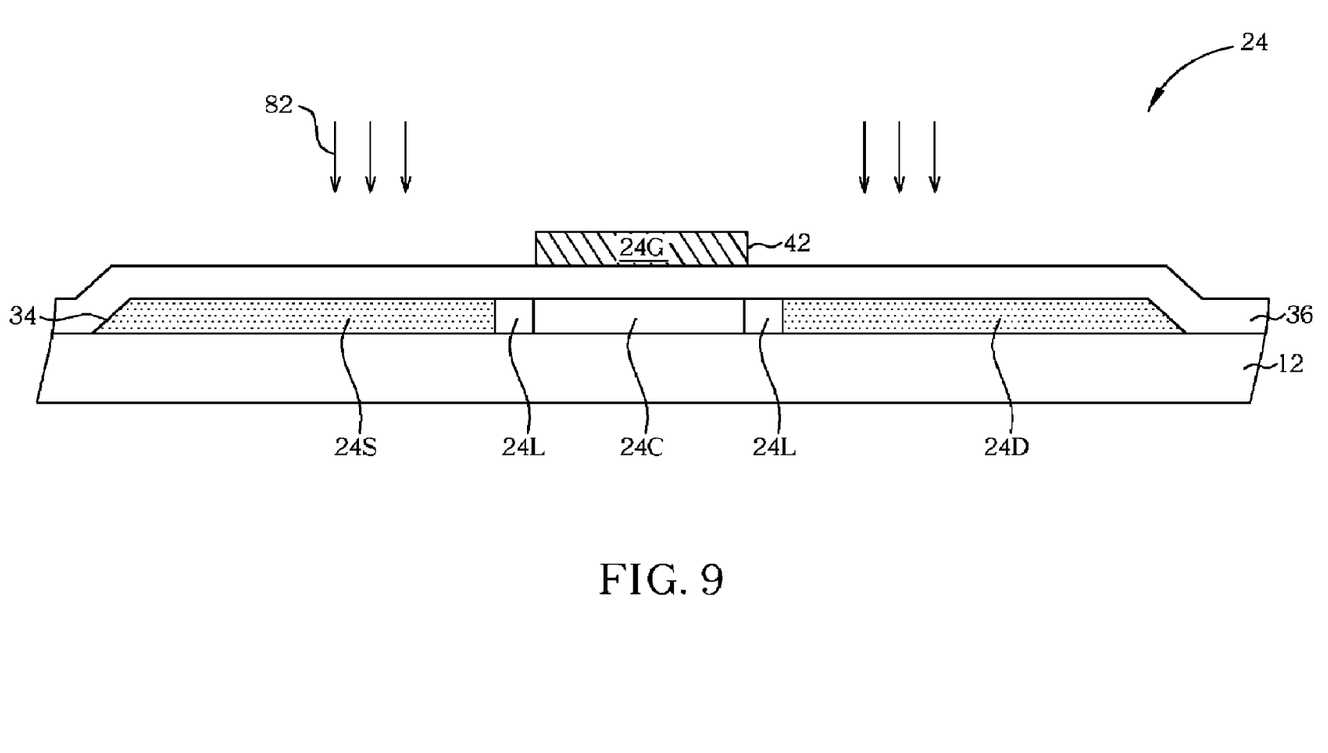

With reference to FIG. 9, the patterned photoresist layer 78 is removed, and the gate 24G is taken as a mask to perform an upright ion implantation process 82 with low concentration ions, such as P− type ions, to form lightly doped drains (LDDs) 24L in the first patterned conductive layer 62, between the two sides of the gate 24G to the source 24S and drain 24D. The portion of the first patterned conductive layer 62 without doping right below the gate 24G serves as the channel region 24C of the TFT 24. As mentioned above, according to the fabrication process of the TFT 24 of the present invention, only a photolithography process and a patterned photoresist layer 78 are needed for defining the patterns of the gate 24G, source 24S, drain 24D, and LDDs 24L. As a result, the TFT 24 can be fabricated by using only two photomasks, effectively reducing the amount of photomasks and saving the fabrication cost. Accordingly, although three metal layers are applied for forming the devices of the pixel structure 86 of the present invention, the total amounts of photomask and photolithography process used in the fabrication process may be the same as that of the traditional fabrication method. Therefore, the fabrication process and cost of the present invention can meet the current process and cost standard.

Figure 10:
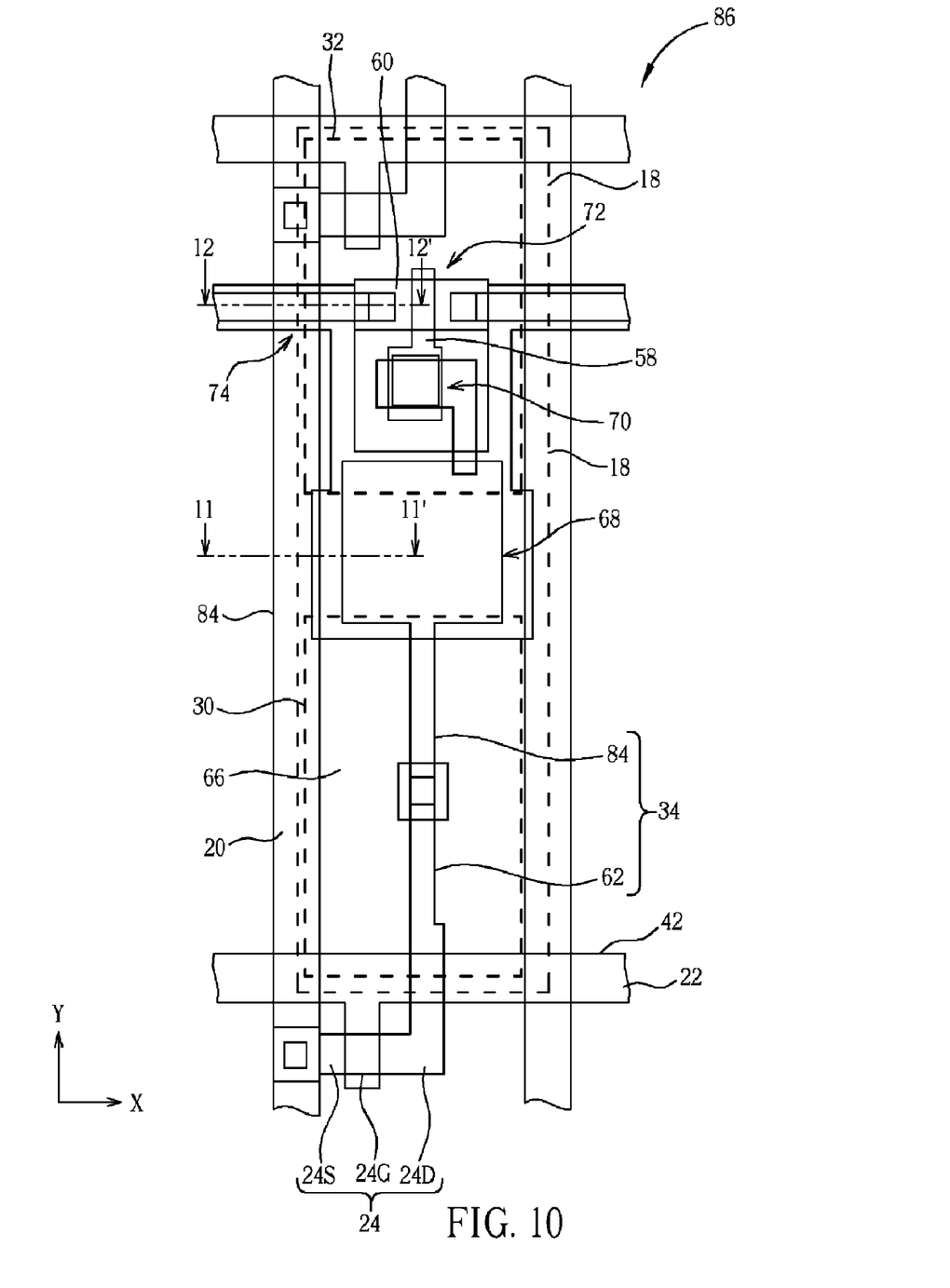
FIGS. 10 is a schematic diagram of top view of a pixel structure according to a second embodiment of the present invention.
Figure 11:
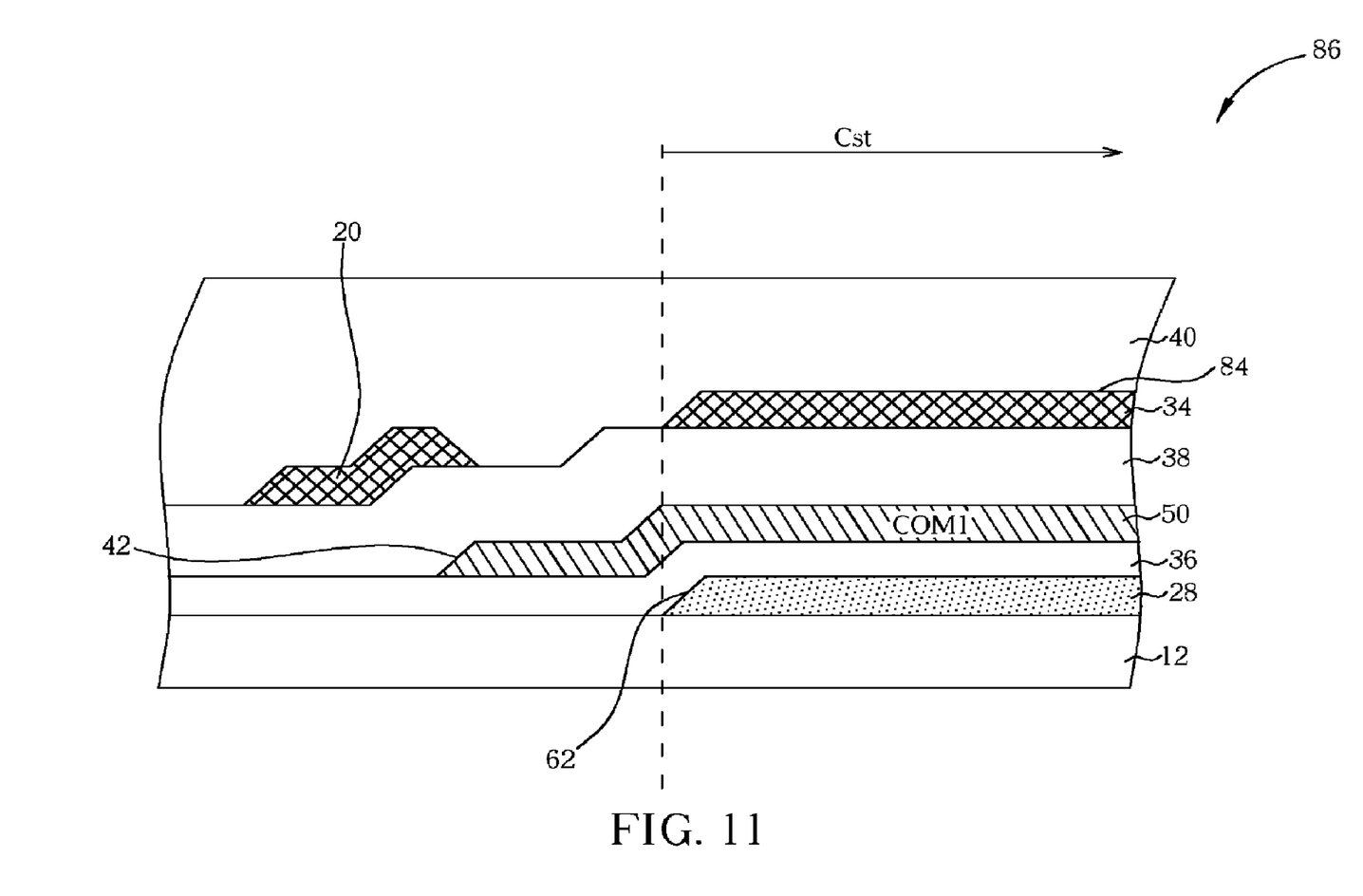
FIGS. 11-12 are sectional views along line 11-11' and line 12-12' of the pixel structure shown in FIG. 10 respectively.
Figure 12:
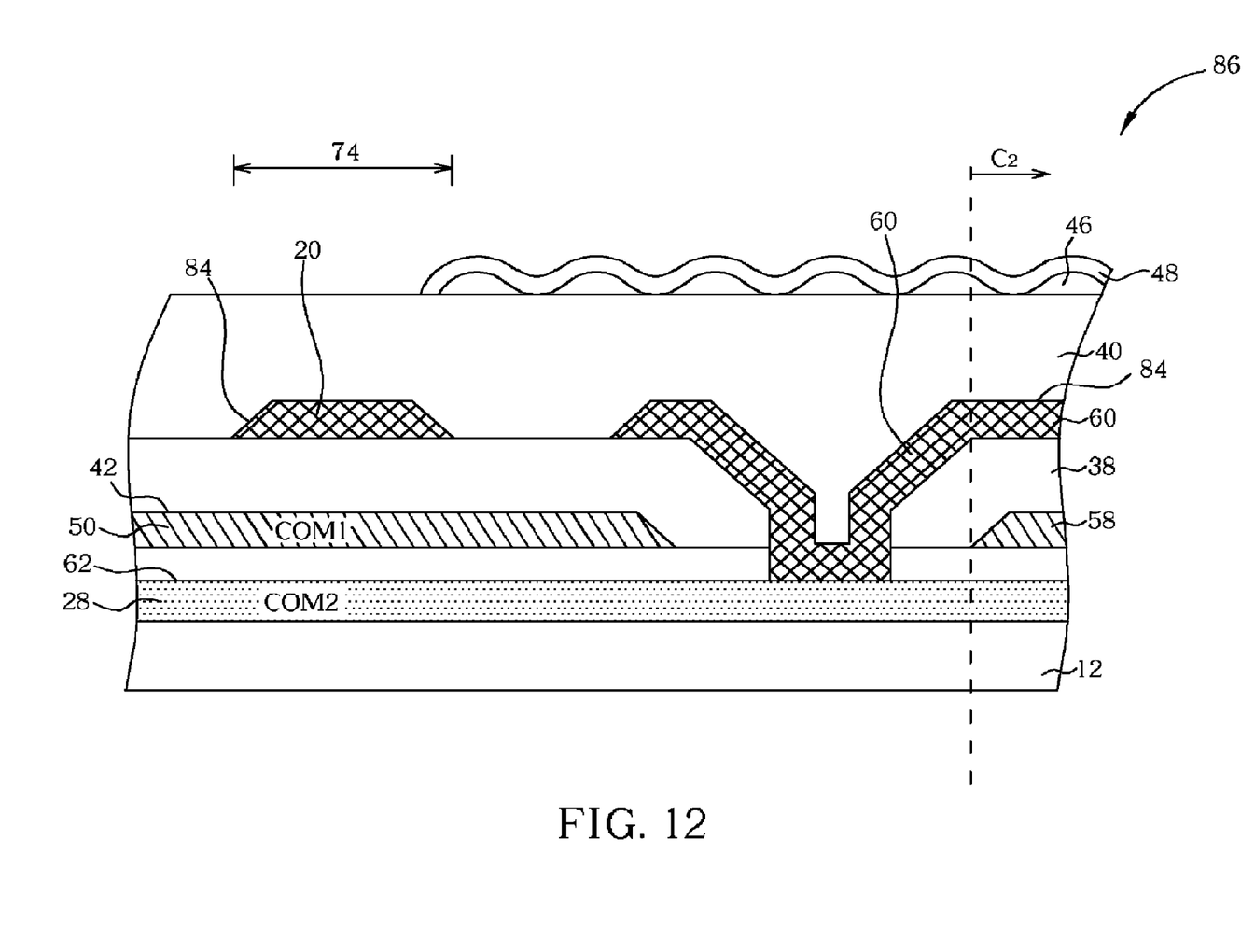

FIGS. 10-12 is a schematic diagram of a pixel structure according to a second embodiment of the present invention, wherein FIG. 10 is a top-view of the pixel area, and FIGS. 11-12 are sectional views along line 11-11' and line 12-12' of the pixel structure shown in FIG. 10 respectively. Noted that similar elements and devices are represented by the same numerals in the first and second embodiments. The first and second common electrodes 50, 28 in this second embodiment are formed with different patterned conductive layers from those in the first embodiment. Clearly speaking, the first and second common electrodes 50, 28 are formed with the second patterned conductive layer 42 and the first patterned conductive layer 62 respectively. Therefore, the formation of the third patterned conductive layer 52 in the first embodiment is omitted, such that the amount of photomask and cost of the fabrication process may be further lowered.

The detailed design of the pixel structure 86 according to the second embodiment of the present invention pixel is described in the following. First, with reference to FIG. 10, the pixel area 18 is surrounded by two data lines 20 and two scan lines 22, comprising a transmission region 30 and a reflection region 32. The data lines 20 and the scan lines 22 are formed with the third patterned conductive layer 84 (corresponding to the fourth patterned conductive layer 54 in the first embodiment) and the second patterned conductive layer 42 respectively. The TFT 24 of the pixel area 18 is positioned in the reflection region 32 of an adjacent pixel area 18, electrically connected to the transmission pixel electrode 66 in the transmission region 30 through the extending electrode 34. The transmission pixel electrode 66 couples with the transparent electrode disposed on the surface of the first substrate 12 to form a transmission LC capacitor $C_{LCt}$.

Referring to FIG. 11, in the storage capacitor region 68, the extending electrode 34 is formed with the third patterned conductive layer 84 and the first patterned conductive layer 62, forming the storage capacitor $C_{st}$ with the first common electrode 50. In addition, the extending electrode 34 further forms a first coupling capacitor 70 by coupling with the reflective pixel electrode 58 in the reflection region 32, as shown in FIG. 10.

With reference to FIG. 12, the reflective pixel electrode 58 is electrically connected to a reflection layer 48 on the surface of the planarization layer 40, and forms a reflection LC capacitor $C_{LCr}$ by coupling with the transparent electrode (not shown) on the second substrate 14, wherein the reflection LC capacitor $C_{LCr}$ is electrically connected to the first coupling capacitor 70 in series. In addition, the reflective pixel electrode 58 further forms a second coupling capacitor 72 by coupling with the second common electrode 28, parallel to the reflection LC capacitor $C_{LCr}$.

Similar to the first embodiment of the present invention, the first common electrode 50 of this embodiment is formed with the second patterned conductive layer 42, and is substantially parallel with the second common electrode 28 composed of the first patterned conductive layer 62. The first common electrode 50 and the second common electrode 28 intersect the data line 20 in an overlapping area 74. In the overlapping area 74, the first common electrode 50 is disposed between the second common electrode 28 and the data line 20 along vertical axis so as to shield the influence from the data line 20 to the second common electrode 28 and to improve cross-talk problem. In addition, the first common electrode 50 only lines and bends downward near the two sides of the second coupling capacitor 72 into the storage capacitor region 68, forming the storage capacitor $C_{st}$ with the extending electrode 34.

In addition, in this embodiment, since the first patterned conductive layer 62 is used for forming the source 24S, drain 24D, a portion of the extending electrode 34 of the TFT 24 and the second common electrode 28, it preferably comprises polysilicon materials, and may be doped with high concentration ions through an ion implantation process to form a heavily-doped polysilicon layer. On the other hand, the first common electrode 50, the reflective pixel electrode 58, and the scan line 22 are composed of the second patterned conductive layer 42, and the data line 20, a portion of the extending electrode 34, and the second common electrode branch 60 are formed with the third patterned conductive layer 84. Therefore, the second patterned conductive layer 42 and the third patterned conductive layer 84 preferably comprise metal materials and may be considered as a first metal layer and a second metal layer. It should be noted that the advantage of the pixel structure 86 in this embodiment is that all the electric devices of the pixel area 18 are formed only with the first, second, and the third patterned conductive layers 62, 42, 84. Especially, the second common electrode 28 may be formed with the doped polysilicon material layer the same as the source 24S and drain 24D. Therefore, the amount of photomask, process materials and cost can be reduced.

In contrast to the prior art, since the first common electrode of the present invention pixel structure is disposed in the overlapping area between the second common electrode and data line vertically, it can effectively lower the influence of signal or voltage among the second common electrode and data line even though the second common electrode and data line overlap with each other. Therefore, the cross-talk problem is obviously improved. As a result, the pixel structure of the present invention may apply the ACC technique to match the reflection gamma curve with the transmission gamma curve for providing a single-gap transflective LCD panel, wherein the cross-talk effect of the transflective LCD panel can also be improved at the same time.

Those skilled in the art will readily observe that numerous modifications and alterations of the device and method may be made while retaining the teachings of the invention.

What is claimed is:

1. A pixel structure of a transflective liquid crystal panel adapted for a substrate having a pixel area, the pixel area comprising a reflection region and a transmission region, comprising:
    a data line arranged along a first direction on the substrate;
    a scan line arranged along a second direction on the substrate, the scan line intersecting the data line;
    a thin film transistor electrically connected to the scan line and the data line, the thin film transistor comprising an extending electrode;
    a first common electrode and a second common electrode disposed on the substrate, the first common electrode and the second common electrode being substantially arranged along the second direction and intersecting the data line in an overlapping area, wherein the first common electrode, the second common electrode, and the data line overlap with each other, and the first common electrode in the overlapping area is disposed between the second common electrode and the data line;
    a transmissive pixel electrode electrically connected to the thin film transistor; and
    a reflective pixel electrode forming a first coupling capacitor with the extending electrode and forming a second coupling capacitor with the second common electrode.

2. The pixel structure of claim 1, wherein the extending electrode is a portion of a drain of the TFT.

3. The pixel structure of claim 1, wherein the data line within the overlapping area is disposed above the first common electrode and the second common electrode.

4. The pixel structure of claim 1, further comprising a first patterned conductive layer and a second patterned conductive layer disposed on the substrate, a source and a drain of the TFT comprising portions of the first patterned conductive layer, and the second common electrode and the scan line comprise portions of the second patterned conductive layer.

5. The pixel structure of claim 4, wherein the second patterned conductive layer comprises a first metal layer.

6. The pixel structure of claim 4, further comprising a third patterned conductive layer and a fourth patterned conductive layer disposed on substrate in order, the first common electrode and the data line comprise a portion of the third patterned conductive layer and a portion of the fourth patterned conductive layer respectively.

7. The pixel structure of claim 6, wherein the third patterned conductive layer and the fourth patterned conductive layer comprise a second metal layer and a third metal layer respectively.

8. The pixel structure of claim 1, comprising a first patterned conductive layer disposed on the substrate, wherein the second common electrode and a source and a drain of the thin film transistor comprise a portion of the first patterned conductive layer respectively.

9. The pixel structure of claim 8, wherein the first patterned conductive layer comprises a doped polysilicon layer.

10. The pixel structure of claim 9, further comprising a second patterned conductive layer and a third patterned conductive layer, wherein the first common electrode and the scan line comprise a portion of the second patterned conductive layer respectively, and the data line comprises a portion of the third patterned conductive layer.

11. The pixel structure of claim 10, wherein the second patterned conductive layer and the third patterned conductive layer comprise a first metal layer and a second metal layer respectively.

12. The pixel structure of claim 1, wherein the first coupling capacitor and the second coupling capacitor are disposed in the reflection region.

13. The pixel structure of claim 1, wherein the thin film transistor further comprises at least a lightly doped drain (LDD).

14. The pixel structure of claim 13, wherein the thin film transistor are formed with two photomasks.

15. The pixel structure of claim 13, wherein the LDD, a drain, and a gate of the thin film transistor are formed through a single patterned photoresist layer.

16. The pixel structure of claim 1, wherein the second common electrode is disposed in the reflection region.

17. The pixel structure of claim 1, further comprising a reflection layer disposed in the reflection region, the reflection layer being electrically connected to the reflective pixel electrode and having a rough and uneven surface.

18. The pixel structure of claim 1, wherein the first common electrode and the extending electrode forms a storage capacitor ($C_{st}$).

19. A transflective liquid crystal display (LCD) panel, comprising:
    a first substrate having a pixel area, the pixel area comprising a reflection region and a transmission region;
    a data line disposed on the first substrate along a first direction;
    a scan line disposed on the first substrate along a second direction, the scan line intersecting the data line;
    a thin film transistor electrically connected to the scan line and the data line, the thin film transistor comprising an extending electrode;
    a first common electrode and a second common electrode disposed on the first substrate, the first common electrode and the second common electrode being arranged substantially along the second direction and intersecting the data line in an overlapping area, wherein the first common electrode, the second common electrode, and the data line overlap with each other, and the first common electrode in the overlapping area is disposed between the second common electrode and the data line;
    a transmission pixel electrode electrically connected to the thin film transistor;
    a reflective pixel electrode, forming a first coupling capacitor by coupling with the extending electrode and forming a second coupling capacitor by coupling with the second common electrode;
    a second substrate, disposed oppositely to the first substrate; and
    a liquid crystal layer disposed between the first substrate and the second substrate.

20. The transflective LCD panel of claim 19, wherein the first substrate and the second substrate has a single gap.

* * * * *